April 4, 1967 M. L. ANTHONY ETAL 3,311,973
APPARATUS FOR AUTOMATIC TOOL CHANGING
Original Filed March 7, 1962 3 Sheets-Sheet 2

INVENTORS
MYRON L. ANTHONY
BERNARD R. BETTER
BY Brown, Jackson, Boettcher & Dienner

ATTYS.

United States Patent Office 3,311,973
Patented Apr. 4, 1967

3,311,973
APPARATUS FOR AUTOMATIC TOOL CHANGING
Myron L. Anthony, La Grange, and Bernard R. Better, Chicago, Ill., assignors to Scully International, Inc., Downers Grove, Ill., a corporation of Illinois
Continuation of application Ser. No. 178,060, Mar. 7, 1962. This application Feb. 18, 1966, Ser. No. 556,247
14 Claims. (Cl. 29—568)

The present application is a continuation of our co-pending application Ser. No. 178,060, filed Mar. 7, 1962, now abandoned, which copending application is being abandoned upon the filing of the present application.

The present invention relates to automatic tool changing apparatus of a type adapted to be employed in conjunction with a machine tool to automatically transfer a plurality of tools seriatim from a storage area to a spindle or work station and back again to the storage area. The apparatus of the invention is especially applicable for use in automatic tool changing systems, particularly where data controlled machine tools are employed.

More specifically, the invention relates to a new and improved tool holder having novel gripping portions thereon which are inclined with respect to the longitudinal axis of the holder, preferably at an angle of approximately 90 degrees, and to gripping means adapted to engage said gripping areas through movement in a generally axial direction whereby a tool may be transferred from one position to another and may be handed from one gripping member to another gripping member. The invention also relates to a method of handling a tool from one gripping member to another gripping member.

Various types of automatic tool changing devices have previously been proposed. Such known devices differ in their structure and mode of operation, but, insofar as we are aware, substantially all such devices embody one or more gripping members adapted to grip a tool or tool holder around the periphery thereof in order to transfer a tool from one position to another. In other words, gripping pressure is applied radially with respect to the axis of the tool. Such gripping members commonly comprise a pair of clamping jaws or arms which wrap around a portion of the shank or periphery of a tool holder so as to exert a radial force thereon.

The various tool transfer means heretofore known, wherein a gripping member closes about the periphery of a tool holder, impose several limitations regarding the versatility of operation of an automatic tool changing system. Thus, where a gripping member must move radially toward the shank of a tool holder and present a pair of open arms or jaws adapted to encompass the holder, it will be readily apparent that the gripper cannot pass through a tool position when the position is occupied by a tool.

Another limitation imposed by tool holders and gripping means heretofore known is that the open arms or jaws on the gripper must approach the tool holder from a given direction, so as to permit the gripping arms or the like to encompass a portion of the holder. In other words, the relative movement between a gripper and a tool holder must be adapted to bring the axis of the holder between the jaws or the like on the gripper.

A further disadvantage of known devices of the type above-mentioned relates to the transfer or handing off of a tool from one gripping means to another. Thus, if a first gripping device is engaged about the periphery of a tool holder, and the holder is to be transferred to a second gripping device, the latter must engage about the tool at a position axially spaced from the position of the first gripping means. Accordingly, if it is desired to transfer a tool from one gripping device to an identical gripper which will assume the same axial position relative to the tool as the first gripper, it is necessary to provide an intermediate gripping member to hand the tool from the first to the second gripper.

It is an object of the present invention to provide a tool holder having novel gripping portions thereon, and a novel gripping member for cooperation therewith, which overcome the foregoing disadvantages and permit greater versatility in automatic tool changer movements.

Another object of the invention is to provide a tool holder and a gripping member for cooperation therewith, whereby a tool changer mechanism embodying the same may pass through a tool position, even when the position is occupied by a tool.

A further object is to provide holder and gripper components of the type above-mentioned whereby a tool may be approached and grasped from substantially any direction.

A still further object of the invention is to provide tool holder and gripper components which are adapted to permit two identical grippers on the same holder at the same time, with said grippers being in axial alignment with each other relative to the holder.

Another of our objects is to provide a tool holder having gripping areas thereon which extend generally radially with respect to the axis of the holder, and to provide in conjunction therewith gripper means which are adapted to apply gripping pressure thereto in a direction generally parallel to the axis of the holder.

In furtherance of the foregoing objects, and in accordance with a preferred embodiment of the invention, we provide a tool holder having flange means thereon which project outwardly from the shank of the holder in a generally radial direction, and presents opposed gripping surfaces. The flange means may, for example, comprise two flange portions which are circumferentially spaced 180 degrees from one another and lie in the same transverse plane, or said means may comprise a continuous flange which extends around the circumference of the holder. In conjunction with such a holder. we provide a gripper member having a pair of jaws adapted to clamp against the opposite faces of the flange, such jaws being adapted to move in a direction generally parallel to the axis of the tool holder in order to effect gripping.

With the foregoing arrangement, the gripper may be moved in the plane of the flange means so as to approach the flange from any direction, and may even pass through a tool position when the position is occupied by a tool, the latter being possible due to the fact that the flange on the holder can pass freely between the jaws on the gripper as long as the jaws are in open position. Furthermore, two identical grippers may be simultaneously engaged on circumferentially spaced portions of the flange means, thus eliminating the need for an intermediate stage when transferring from one gripper member to another.

Still another object of the invention is to provide a method of transferring a tool or tool holder from one gripping member to another gripping member.

Other objects, uses and advantages of the invention will become apparent, or be obvious, from the following specification, particularly when considered in connection with the drawings in which.

Figure 10:
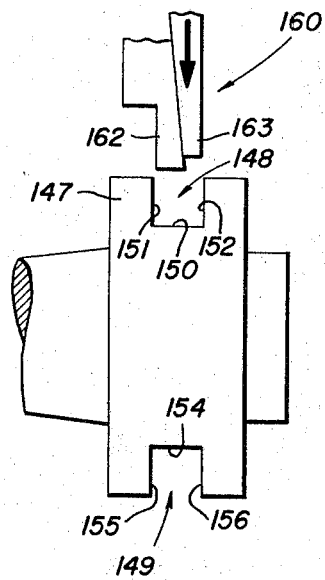
Figure 11:
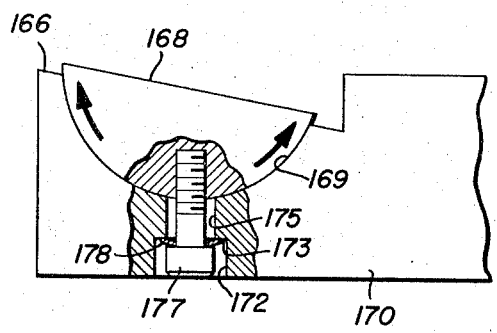

FIGURE 10 is a fragmentary elevational view showing still another modified form of tool holder and gripper components wherein interior gripping surfaces extend radially inwardly from the periphery of opposed flange portions on the holder and comprise the sides of slots or recesses formed in each of said flange portions, said view further showing a fragmentary portion of one form of gripper member suited for engaging against said gripping surfaces; and FIGURE 11 is a fragmentary elevational view showing a further modified form of gripper member, wherein a floating pad is seated in a recess in one of the faces of a gripper jaw so as to accommodate any misalignment between the jaw and a flange portion to be gripped thereby.

It should be understood that when reference is made herein and in the appended claims to a "tool holder," such term should be interpreted to include tools, tool holders, and work pieces, since it will be readily apparent that flange gripping portions and the like, which are formed on a tool holder to cooperate with a gripper member, may, if desired, be formed directly on a tool or on a work piece which is to be transferred from one position to another.

Referring now to the drawings, reference is first made to FIGURE 1, since it is believed that a general description of the tool changing system represented therein will be useful in understanding the advantages of the gripper and tool holder components of the present invention, which components will themselves be described in detail hereinafter.

Figure 1:
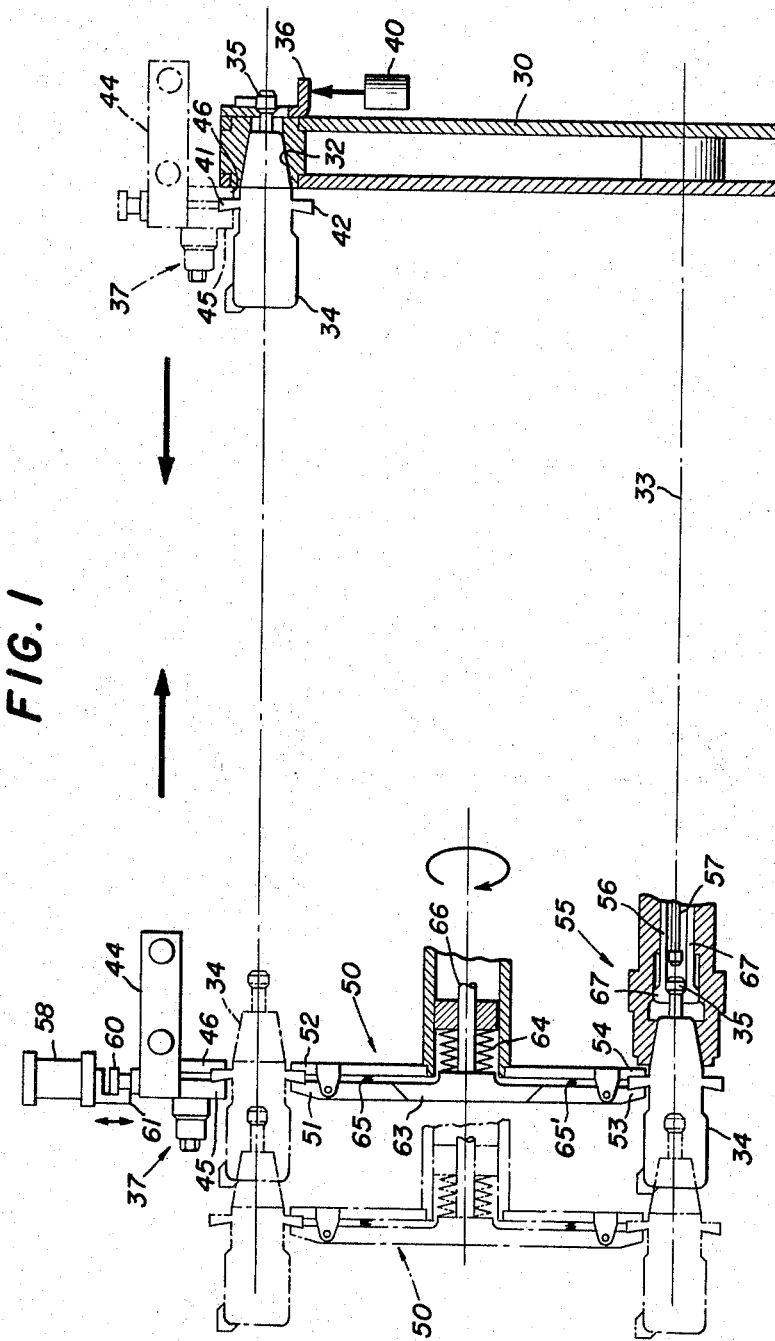
FIGURE 1 is a generally schematic side elevational view of an automatic tool changing system illustrating, by way of example, one suitable application of the holder and gripping components of the invention.

FIGURE 1 is a side elevational view, substantially schematic in form, showing at 30 a fragmentary portion of a matrix or tool storage member, which may for example be a large circular disc-shaped member having a plurality of circumferentially spaced sockets as at 32. The matrix 30 may be rotatable about a horizontal axis 33 so as to position any one of the sockets 32 in a predetermined position for insertion or removal of a tool.

A tool holder 34 having a knob 35 projecting from its rear end is shown mounted in a socket 32 and held therein by a spring actuated latch member 36 which engages the knob 35 and locks the tool holder in position. A solenoid is represented at 40 for actuating the latch to release the tool holder. It will be understood that a large number of tools may be stored in the matrix 30 for transfer to a work station as needed.

In accordance with one aspect of the present invention, the tool holder 34 is provided with an upper flange portion 41 and a lower flange portion 42, and a movable shuttle member 44 is provided with a gripping member 37 comprising jaws 45 and 46, the latter being shown clamped on the opposite faces of the upper flange portion 41. The shuttle 44 is shown in dash lines in its extreme right hand position, and is shown in its extreme left hand position in solid lines, the shuttle being movable from one of said positions to the other along a track or other guide means by a chain drive or other suitable drive means (not shown). A double acting cylinder 58 is provided for raising and lowering the gripping member 37 of the shuttle when the latter is in its extreme left hand position where a lug 60 on the gripping member 37 is engaged by a hook 61 provided at the lower end of a piston which is reciprocable within the cylinder 58. Gripping member 37 is moved upwardly and downwardly within the shuttle in a guideway (not shown).

A transfer arm 50 is shown in its right hand position in solid lines and in its left hand position in dash lines, said arm being movable axially through a short stroke, and also being rotatable about its horizontal axis. The transfer arm 50 is provided with a gripper member at each of its ends, one such gripper member comprising jaws 51 and 52, and the other comprising jaws 53 and 54. An actuator 63 and compression spring 64 are shown for biasing the jaws to closed position, tension springs 65 and 65' being provided to open the jaws when a draw bar 66 connected to the actuator is moved axially rearwardly by hydraulic or other suitable actuating means (not shown).

A spindle of a machine tool is indicated generally at 55, and collet means for holding a tool in the spindle is shown at 56, the collet means comprising a plurality of gripping fingers 67 adapted to engage the knob 35 upon movement of the fingers axially rearwardly by collet actuating means (not shown). An ejector rod 57 is axially movable with the fingers 67, whereby when said fingers are moved forwardly to release a tool holder 34, the rod 57 will butt the rear face of the knob 35 and aid in the removal of the holder from the spindle.

By way of example, a sequence of operations for the tool changing system represented in FIGURE 1 will now be described. It will be assumed that a tool 34 is in the spindle 55, and that it is desired to return this tool to the matrix 30 and to transport another tool from the matrix to the spindle for a further machining operation. It will also be assumed that the shuttle 44 is in its extreme right hand position with the shuttle jaws 45 and 46 open. Thus, the matrix 30 is indexed or rotated until a selected tool is positioned with its flange portion 41 disposed between the open shuttle jaws 45 and 46, after which the matrix is stopped. The foregoing operation may be controlled by automatic control means which do not form a part of the present invention, and thus will not be described herein.

Once the selected tool is positioned with its flange portion 41 disposed between the shuttle jaws 45 and 46, the shuttle jaws are closed and the tool is released in the matrix by actuation of the solenoid 40, after which the shuttle 44 is moved to its extreme left hand position. During the foregoing operations the transfer arm will normally be in a neutral position, i.e., it will be in its right hand position and will be rotated 90 degrees from the position shown in FIGURE 1 so as to extend substantially horizontally. If desired, the neutral position may be other than horizontal, as long as it is rotated sufficiently from the position of FIGURE 1 to avoid interference with a tool which is being brought forward by the shuttle. It will thus be seen that a tool is selected from the matrix 30 and transferred to an intermediate station from which it may be transported to the spindle.

The foregoing operations thus far described may be performed while a tool in the spindle is engaged in a machining operation, in which case the new tool is simply held at the intermediate stage by the shuttle jaws 45 and 46 until the spindle 55 is stopped. If a tool or tool holder is provided with a pair of distinct flange gripping areas such as at 41 and 42, rather than a continuous flange as in FIGURE 7, then it will be necessary to provide registering means for stopping the spindle so that the flange portions on the tool holder mounted therein will be disposed vertically. Such registering means, however, form no part of the present invention.

With the shuttle 44 in its left hand position with a newly selected tool gripped in its jaws, and with the spindle 55 stopped, the transfer arm jaws 51, 52, 53 and 54 are opened and the transfer arm is rotated from its neutral position to a vertical position whereby the jaws 51 and 52 will encompass the lowermost flange portion 42 on the newly selected tool, and the jaws 53 and 54 will encompass the uppermost flange portion on the tool which is disposed in the spindle 55, after which the transfer arm jaws are closed. The shuttle jaws 45 and 46 are then opened, and the shuttle gripping member 37 is raised by the cylinder 58.

It will be understood that the purpose of raising the shuttle gripper 37 by the double acting cylinder 58 is to move the shuttle gripper away from the upper flange portion on the tool holder being gripped by the transfer arm jaws 51 and 52, whereby the transfer arm may be moved axially to the left without interference with the shuttle jaws 45 and 46. Accordingly, it will be apparent that other shuttle gripper motions may be employed to accomplish the foregoing purpose, for example, the shuttle gripper 37 may be hingedly associated with the shuttle 44. In the latter instance, the gripper 37 may be pivoted out of the position shown in FIGURE 1 to permit axial movement of the transfer arm 50 after receiving a tool from the shuttle gripper.

Once the gripping member 37 has been moved upwardly, the collet 56 is actuated to release the tool in the spindle, and the transfer arm 50 is moved axially to the left an amount sufficient to remove the old tool from the spindle, the ejector rod 57 aiding in the ejection of the old tool by being moved to the left to butt against the knob 35 thereon. The transfer arm 50 is then rotated 180 degrees and returned to its right hand position whereby the newly selected tool is inserted in the spindle, after which the collet 56 is closed, the gripping member 37 of the shuttle 44 is lowered, and the shuttle jaws 45 and 46 are closed about the upper flange portion on the tool which has been removed from the spindle.

Having thus inserted a new tool spindle 55 and removed the old tool therefrom, the transfer arm jaws 51, 52, 53 and 54 are opened, and the transfer arm 50 is rotated from its vertical position to a neutral position. The shuttle 44 is then moved back to its right hand position so as to return the old tool to an empty socket 32 in the matrix 30, the tool being automatically locked therein by latch 36. The shuttle jaws 45 and 46 are then opened, after which the matrix may be indexed to search for the next tool to be transferred to the spindle.

Figure 2:
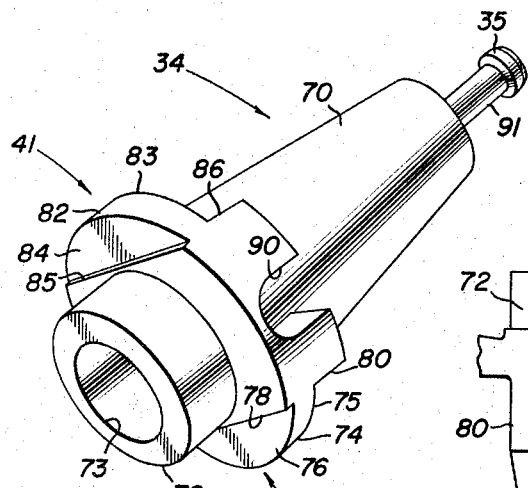
FIGURE 2 is a perspective detail view of a flanged tool holder embodying the present invention.

Reference is now made to FIGURE 2 which shows a tool holder 34 having flange portions 41 and 42 formed thereon. The tool holder 34 comprises a body portion including a tapered end 70 adapted to be received in the spindle of a machine tool, a shank 72 having a bore 73 for receiving a tool to be mounted in the holder, and an intermediate portion from which the flange portions 41 and 42 project.

The flange portion 42 comprises an arcuate peripheral wall 74, a rear face 75, and a forward face 76. As the forward face 76 extends radially inwardly toward the shank of the holder, it is inclined towards the rear face 75, thus providing a thicker radially outer flange portion which will permit more effective gripping action between a pair of gripping jaws and the flange. The rear face 75 is generally perpendicular to the longitudinal axis of the tool holder. It will also be noted that the forward face 76 terminates at a flat shoulder portion 78, and the rear face 75 terminates at a flat shoulder 80. The oppositely disposed flange portion 41 is substantially identical to the flange portion 42 and comprises an outer arcuate peripheral wall 82, a rear face 83 perpendicular to the axis of the holder, an inclined forward face 84, and shoulder portions 85 and 86. It will be understood that the inclination of the forward flange faces 76 and 84 represents but one embodiment of the present invention. If desired, the forward flange faces may be made parallel to the rear flange faces 75 and 83.

A pair of U-shaped recesses are provided in the holder for receiving corresponding lugs which may be mounted on a machine tool spindle to effect a positive drive connection between the tool holder and a spindle in which said holder is mounted. One such recess is shown at 90, and a similar recess is circumferentially spaced 180 degrees therefrom.

The rear end of the tapered section 70 is provided with a tapped bore to accommodate a knob 35 having a threaded shank 91 adapted to be received within the bore, the knob being utilized in the locking of the tool holder in a matrix and in a machine tool spindle.

Figure 3:
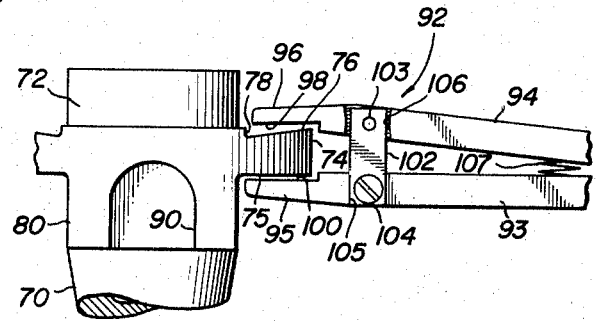
FIGURE 3 is a fragmentary view showing the manner in which jaws on a gripper may engage against opposite faces on a flange on the tool holder of FIGURE 2, the gripping movement of the jaws being substantially parallel to the axis of the holder.
Figure 4:
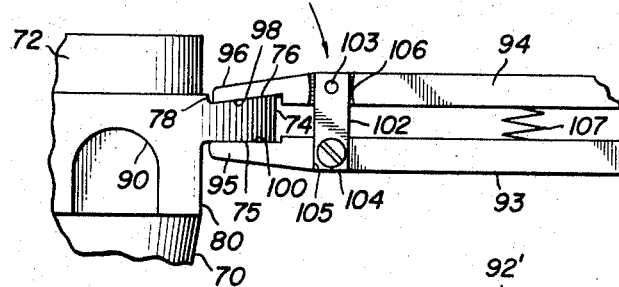
FIGURE 4 is a view similar to FIGURE 3 showing the gripper jaws in closed position.

FIGURES 3 and 4 illustrate the manner in which a gripping member may be clamped on one of the flange portions 41 and 42. Thus, there is shown a gripper 92 having a pair of arms 93 and 94, the end of the arm 93 comprising a jaw 95 and the end of the arm 94 comprising a jaw 96. The jaw 96 has an inner face 98 which is inclined with respect to the arm 94 so as to correspond to the inclined flange face 76, the jaw 95 having an inner face 100 which is substantially parallel to the arm 93 so as to correspond with the flange face 75.

The arms 93 and 94 are connected by a brace 102 which is hingedly connected to the arm 94 by a pin 103, and is secured on the other arm 93 by a screw 104. The ends of the brace 102 are seated in corresponding slots in the sides of the arms 93 and 94, the lower end thereof being received in a slot 105 which is only slightly wider than the brace, and the upper end being received in a slot 106 which is dimensioned to provide clearance sufficient to permit limited relative pivotal movement between the brace and the arm 94. A brace similar to the brace 102 is provided to bridge the opposite sides of the arms 93 and 94.

It will be understood from the foregoing that the arm 94 may be pivoted about the hinge pin 103 so as to open and close the jaws 95 and 96, the jaws being shown in open position in FIGURE 3 and in closed position in FIGURE 4. It is preferable that the jaws be biased to closed position by compression spring means. As a schematic illustration of such means, there is shown a compression spring 107 mounted between the arms 93 and 94, inwardly of the brace 102. Hydraulic actuating means (not shown), or other suitable power means, may be provided to actuate the jaws to open position. It will be understood that the compression spring 107 is shown only by way of example. Another arrangement for closing a plurality of gripping jaws is shown by the compression springs 64 and related components in FIGURE 1.

Figure 5:
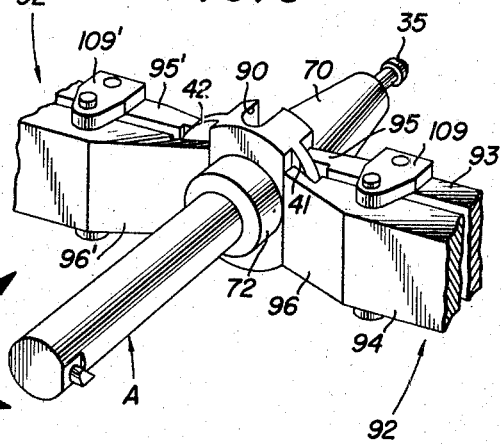
FIGURE 5 is a perspective view showing a tool mounted in the tool holder of FIGURE 2, and further showing fragmentary portions of two substantially identical gripper members engaged on respective flange portions which extend generally radially outwardly from the shank of the holder.
Figure 6:
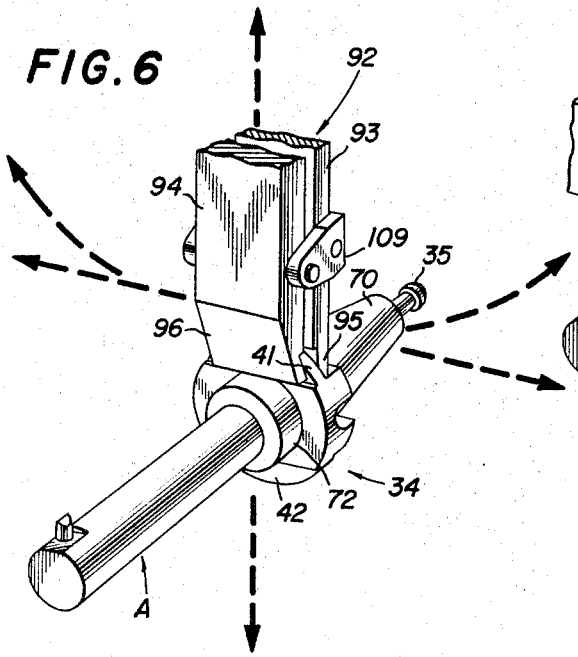
FIGURE 6 is a perspective view showing the tool and tool holder of FIGURE 5 rotated 90 degrees about its own axis, and showing one gripper member engaged on a flange portion thereof, a plurality of arrows being utilized to indicate some of the various directions from which the gripper may approach the holder.

FIGURES 5 and 6 illustrate, by way of example, certain modes of cooperation between the gripper members and the flanged tool holder 34. FIGURE 5 shows the flanged tool holder 34 with a tool A mounted in the bore 73, and further shows two substantially identical gripping members clamped respectively on the opposed flange portions 41 and 42. The two grippers are indicated generally at 92 and 92', and each includes a modified form of brace member as shown at 109 and 109', respectively.

Still referring to FIGURE 5, a method of transferring a tool in accordance with the present invention comprises supporting the tool in a first gripper member 92 by closing the jaws 95 and 96 thereof against the opposite faces of the flange portion 41, the jaws being movable towards one another in a direction generally parallel to the axis of the tool holder 34 in order to apply gripping pressure to the flange. A second gripping member 92' is then positioned in substantial axial alignment (relative to the axis of the holder) with the first gripper and with its jaws 95' and 96' encompassing the opposite flange 42, and said jaws are moved towards one another in a direction generally parallel to the axis of the tool holder to apply gripping pressure to the latter flange portion, whereby both of the grippers simultaneously engage respective circumferentially spaced portions of a flange on the holder 34. The jaws on the first gripper 92 may then be opened to complete the transfer of the tool from one gripping member to another. It will be seen that the tool may be transferred between two substantially identical grippers without changing the relative axial position between the tool and the gripper, and without need for an intermediate transfer operation.

FIGURE 6 shows the tool holder 34 and tool A supported by the single gripper member 92, and a plurality of arrows are shown to indicate by way of example some of the various gripper motions permitted by the present invention. Thus, the gripper 92, with its jaws 95 and 96 open, may approach the flange portion 41 from above, from either side thereof, or along an intermediate inclined path, as long as the gripper is disposed substantially in the plane of the flange. A similar variation in motions would of course be possible for a gripper approaching the opposite flange portion 42.

It will be understood that the present invention is based on the concept that a tool holder (or a tool or work piece) may be provided with protruding means having gripping areas which are inclined with respect to the longitudinal axis of the holder, as distinguished from the known concept of gripping a tool around the periphery thereof. While in the preferred embodiment the protruding means comprise a flange which is substantially perpendicular to the axis of the holder and which is gripped by movement of a pair of jaws toward one another in a direction generally parallel to the axis of the holder, it will be readily apparent that the invention may take various forms. That is, the protruding means need not comprise a flange in the strict sense of the word but may comprise any means which extends radially outwardly from the body portion of the tool holder and is capable of being gripped by clamping means or the like which apply gripping pressure in a direction generally parallel to the axis of the tool holder. It will also be apparent that the present invention is not strictly limited to the use of protruding means which lies in a plane perpendicular to the axis of the tool holder, but it is desirable that the protruding means be inclined substantially with respect to such axis so as to project outwardly from the body portion of the tool holder and present opposed surfaces which can readily be gripped.

Figure 7:
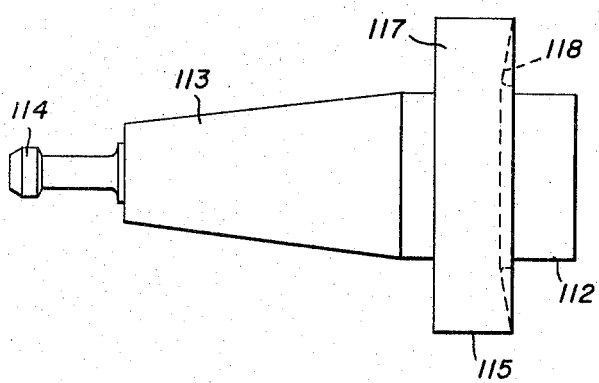
FIGURE 7 is an elevational view showing a modified form of tool holder wherein a flange extends continuously around the periphery of the tool holder.

FIGURE 7 illustrates one modified form of tool holder comprising a shank 112, tapered portion 113, knob 114, and a continuous flange 115 which completely encircles the shank. The flange 115 comprises a rear annular face 117 which is generally perpendicular to the shank, and a forward annular face 118 which is inclined to present a thicker section at the radially outer portions of the flange, the annular face 118 thus comprising in effect the frustrum of a cone, so as to be somewhat dish-shaped in its configuration. Preferably, a gripper member for use with the tool holder of FIGURE 7 should comprise a jaw having a gripping face which conforms to the configuration of the flange face 118.

Figure 8:
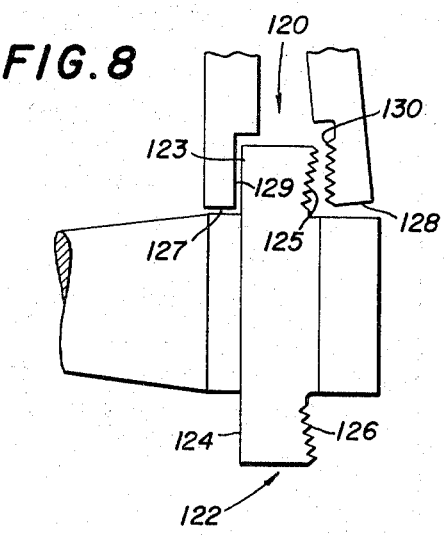
FIGURE 8 is a fragmentary view showing another modified form of tool holder wherein a pair of circumferentially spaced flange portions are each provided with serrations on one of their faces, and further showing a fragmentary portion of a gripper member wherein one of the jaws thereof is provided with complementary serrations.

FIGURE 8 shows a further modified form of tool holder and corresponding gripping member wherein the holder comprises a pair of flange portions 120 and 122 having rear faces 123 and 124 and inclined forward faces 125 and 126. Corresponding gripper jaws are shown at 127 and 128 and comprise inner faces 129 and 130, the face 130 being inclined to correspond to the inclination of the flange faces 125 and 126. It will be noted that the inclined flange faces 125 and 126 and the corresponding gripper jaw face 130 are formed with serrations which extend substantially chordally across the faces, so as to provide a more effective coupling when the jaws are closed against the flange faces.

Figure 9:
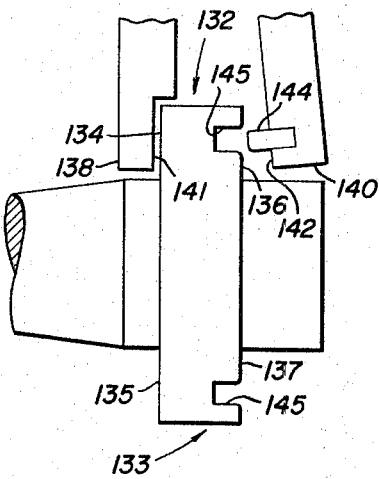
FIGURE 9 is a fragmentary elevational view showing another modified form of tool holder and gripper wherein positive gripping is effected by a rib which projects from the inner face of one of the gripper jaws and is adapted to extend into a corresponding slot provided in one face of a flange on the tool holder.

FIGURE 9 shows still another modified form of the invention wherein the tool holder comprises a pair of flange portions 132 and 133 having rear faces 134 and 135 and forward faces 136 and 137, the forward and rear faces being parallel and substantially perpendicular to the longitudinal axis of the holder. Corresponding gripper jaws are shown at 138 and 140 and comprise inner faces 141 and 142. In this embodiment, the gripper face 142 has a transverse rib 144 projecting therefrom, which rib is adapted to be received in one of two corresponding slots 145 formed in the forward flange faces 136 and 137, respectively.

While, in the embodiment of FIGURE 9, the member 144 comprises a transverse rib, it will be understood that said member may be a projecting pin of circular cross section, or may comprise a pin with a conical end portion, or may take various other desired forms, the object being to provide means for effecting a positive locking action when the gripper jaws are closed against the flange faces. In each case, the recess 145 can be formed to correspond to the selected configuration of the projecting member.

FIGURE 10 illustrates the manner in which a flange, or if desired, the shank of a tool holder, may be recessed to provide interior face portions against which elements of a gripper member may expand. There is shown a tool holder comprising a continuous flange 147 which is provided with two flat parallel slots 148 and 149. The slot 148 comprises a flat base portion 150 and parallel side walls 151 and 152, and the oppositely disposed slot 149 comprises a flat base portion 154 and a pair of parallel side walls 155 and 156. It will be understood that with recessed or interior flange faces, as at 151 and 152, it is necessary to provide gripping means adapted to be expanded or spread apart after entering the space between the flange faces. One such gripping means is shown at 160 and comprises a pair of wedge members 162 and 163 which when moved longitudinally relative to one another can be caused to expand laterally, thus being adapted to be inserted in the slot 148 and expanded to apply gripping pressure to the faces 151 and 152.

FIGURE 11 shows still another modified form of gripper jaw 165 comprising an inner face 166 which is provided with a partially recessed floating pad 168, the pad being shown by way of example as a spherical segment which is seated in a recess 169 in the jaw face 166. An outer jaw face 170 is provided with a bore 172 which terminates at a shoulder or ledge 173, a reduced diameter bore 175 being also provided to extend from the ledge portion into communication with the recess 169.

A cap screw 177 is threaded into the pad 168 and projects outwardly through the bores 175 and 172, a spring washer 178 being positioned on the screw adjacent the head thereof so as to bear against the shoulder 173 and thereby yieldingly hold the pad 168 in the seat 169. Sufficient clearance is provided between the washer 178 and the wall of the bore 172 to permit the pad 168 to float in the seat 169 and thereby align itself with a flange face against which it is to apply gripping pressure.

It will be seen from the foregoing that the stated objects of the present invention have been accomplished. In particular, with reference to the tool changing system of FIGURE 1, it will be seen that with the shuttle 44 in its extreme right hand position and with its jaws 45 and 46 open, it is possible for the matrix 30 to rotate, whereby the flanges on the various tool holders in the matrix can pass between the open shuttle jaws. Thus, it is not necessary to provide means for raising and lowering the shuttle 44 when it is in its right hand position. On the other hand, mechanism similar to the double acting cylinder 58 may be provided adjacent the right hand position of the shuttle, if desired.

It will further be noted that the transfer arm 50 need not be moved vertically in order to engage the lowermost flange portion on a tool held in the shuttle, or to engage the uppermost flange portion on a tool in the spindle 55. The transfer arm need only be rotated from a neutral position to a vertical position, and its jaws then closed, in order to simultaneously grip a tool in the shuttle 44 and a tool in the spindle 55. If desired, a plurality of shuttles may be provided and may be stationed in respective left hand positions simultaneously, since as long as the transfer arm jaws are open the arm can be rotated through a number of tool positions and stopped at a tool to be selected.

Referring again to FIGURE 2, it will be understood that the ends of a gripping jaw will not normally be butted against the shoulder portions such as shown at 75 and 78 (see FIGURES 3 and 4), if the jaws approach the flanged holder by movement in an arcuate path as in the case of the transfer arm 50, or if the holder is moved in an arcuate path as when mounted in the matrix 30. However, where linear tool changer motions are utilized, the gripper jaws may be butted against such shoulder portions (see FIGURES 5 and 6) whereby the latter will function to effect alignment between a gripping member and a tool to be gripped thereby. Furthermore, the forward flange faces 76 and 84, and corresponding gripper jaws, may be inclined sufficiently that a gripper member upon clamping against the faces will draw the tool holder into the gripper jaws until the latter abut the shoulder portions.

A further consideration regarding the matter of alignment relates to alignment between the spindle 55 and a tool being inserted therein. As the tool is moved into the spindle, the latter may act upon the tool to cause slight relative movement between the tool and the transfer arm gripper jaw in which it is held, provided there is no positive locking means between these two members. In this manner, it is possible to correct slight misalignments between the tool and the spindle, during insertion of a tool in the latter. However, the gripping pressure exerted by the transfer arm jaws on a flanged tool holder must of course be sufficient to assure proper support of a tool, even when heavy tools on the order of 180 pounds are being handled.

While certain preferred forms of our invention have been described and illustrated, it will be appreciated that modifications and changes may be made therein by those skilled in the art, particularly with our disclosure before them, and thus we do not intend to be limited to the particular disclosure, except insofar as the appended claims are so limited.

We claim:

1. For use in an automatic tool changing system, tool handling apparatus comprising, in combination, a tool holder having a body portion, protruding means extending outwardly from said body portion, said protruding means being substantially inclined relative to the axis of the said body portion and having a pair of opposed gripping surfaces adapted to be engaged for transporting said holder, and gripping means for transporting said holder, said gripping means being adapted to grip said protruding means through application of gripping pressure to said opposed gripping surfaces.

2. For use in an automatic tool changing system, tool handling apparatus comprising, in combination, a tool holder having a body portion, protruding means extending outwardly from said body portion, said protruding means being substantially inclined relative to the axis of said body portion and having a pair of opposed gripping surfaces adapted to be engaged for transporting said holder, and gripping means for transporting said holder, said gripping means being adapted to grip said protruding means by applying gripping pressure to said opposed gripping surfaces, said pressure being applied through movement of said gripping means in a direction generally parallel to the axis of said holder.

3. For use in an automatic tool changing system, tool handling apparatus comprising, in combination, a tool holder having a body portion, protruding means extending generally radially outwardly from said body portion, said protruding means having a pair of opposed gripping surfaces adapted to be engaged for transporting said holder, and gripping means for transporting said holder, said gripping means being adapted to grip said protruding means by applying gripping pressure to said opposed gripping surfaces, said pressure being applied through movement of said gripping means in a direction generally parallel to the axis of said holder.

4. For use in an automatic tool changing system, tool handling apparatus comprising, in combination, a tool holder having a body portion, flange means projecting generally radially outwardly from said body portion, said flange means having a pair of opposed gripping faces thereon adapted to be engaged for transporting said holder, and gripping means for transporting said holder, said gripping means being adapted to grip said flange by applying gripping pressure to said opposed gripping faces, said pressure being applied through movement of said gripping means in a direction generally parallel to the axis of said holder.

5. The combination of claim 4 wherein one of the opposed flange faces is inclined relative to the other to provide a flange section which is axially thicker at its radially outer portion, and wherein said gripping means comprises a gripping surface which is inclined so as to correspond substantially to the inclination of said one flange face.

6. The combination of claim 4 wherein one of the opposed flange faces is provided with a recess therein, and wherein said gripping means comprises a gripping surface having a projecting portion thereon adapted to be received in said recess to effect positive locking action between said flange and said gripping means.

7. The combination of claim 4 wherein said gripping means comprises a gripping face having a floating pad partially recessed therein to provide improved pressure contact between said flange and said gripping means.

8. For use in an automatic tool changing system, tool handling apparatus comprising, in combination, a tool holder having a body portion, protruding means extending generally radially outwardly from said body portion, said protruding means having a pair of opposed gripping surfaces adapted to be engaged for transporting said holder, and gripping means for transporting said holder, said gripping means comprising a pair of gripping jaws movable in a direction generally parallel to the axis of said holder in order to engage said opposed gripping surfaces and thereby clamp said protruding means within said gripping jaws.

9. For use in an automatic tool changing system, tool handling apparatus comprising, in combination, a tool holder having a body portion, flange means projecting generally radially outwardly from said body portion, said flange means having a pair of opposed gripping faces thereon adapted to be engaged for transporting said holder, and gripping means for transporting said holder, said gripping means comprising a pair of gripping jaws movable in a direction generally parallel to the axis of said holder in order to engage said opposed gripping faces and thereby clamp said flange means within said gripping jaws.

10. For use in an automatic tool changing system for transferring tools or the like from one position to another, a transfer arm having a gripping member at each end thereof, said arm being rotatable about a transverse axis midway between said gripping members, and each of said gripping members having an opening for entry of a gripping portion on a tool to be gripped which opening extends completely through the gripping member in a direction generally tangential to the arc through which said gripping member moves when said arm is rotated whereby said gripping members may be moved past a tool in position to be gripped without interference therewith.

11. For use in an automatic tool changing system for transferring tools or the like from one position to another, a transfer arm having a gripping member at each end thereof, said arm being rotatable about a transverse axis midway between said gripping members, and said gripping members each being adapted to open and close through movement in a direction generally parallel to said transverse axis whereby when said members are open they may be moved past a tool in position to be gripped without interference therewith.

12. For use in an automatic tool changing system for transferring tools or the like from one position to another, a transfer arm having a gripping member at each end thereof, said arm being rotatable about a transverse axis midway between said gripping members, each of said gripping members comprising a pair of jaws adapted to be closed to grip a portion of a tool holder therebetween, and actuating means for producing relative movement between said jaws in a direction generally parallel to said transverse axis to effect gripping and release of a tool holder.

13. For use in an automatic tool changing system, tool handling apparatus comprising, in combination, a tool holder having a main body portion, flange means projecting generally radially outwardly from said main body portion, and movable tool transport means for transporting said tool holder including gripping means for supporting said tool holder solely through gripping on said flange, said gripping means comprising a pair of gripping members which when said tool transport means is in an operative position will extend toward said tool holder an amount sufficient to encompass therebetween a portion of said flange means while terminating short of said body portion, and said gripping members being themselves movable relative to one another in a direction generally parallel to the axis of said body portion so as to engage and grip said flange means on one side only of said body portion so as to hold a portion of said flange means within said gripping members thereby to support said tool holder from said movable transport means.

14. For use in an automatic tool changing system, tool handling apparatus comprising, in combination, a tool holder having a main body portion, flange means projecting generally radially outwardly from said main body portion, and movable tool transport means for transporting said tool holder including gripping means for supporting said tool holder solely through gripping on said flange, said gripping means comprising a pair of jaws which when said tool transport means is in an operative position will extend toward said tool holder an amount sufficient to encompass therebetween a portion of said flange means while terminating short of said body portion, and said gripping jaws being themselves movable relative to one another in a direction generally parallel to the axis of said body portion so as to engage and grip said flange means on one side only of said body portion so as to hold a portion of said flange means within said gripping jaws thereby to support said tool holder from said movable transport means.

No references cited.

RICHARD H. EANES, JR., *Primary Examiner.*